L. D. MERRILL.
GLASS DRAWING AND FLATTENING DEVICE.
APPLICATION FILED MAR. 29, 1916.
1,198,044.
Patented Sept. 12, 1916.
2 SHEETS—SHEET 1.
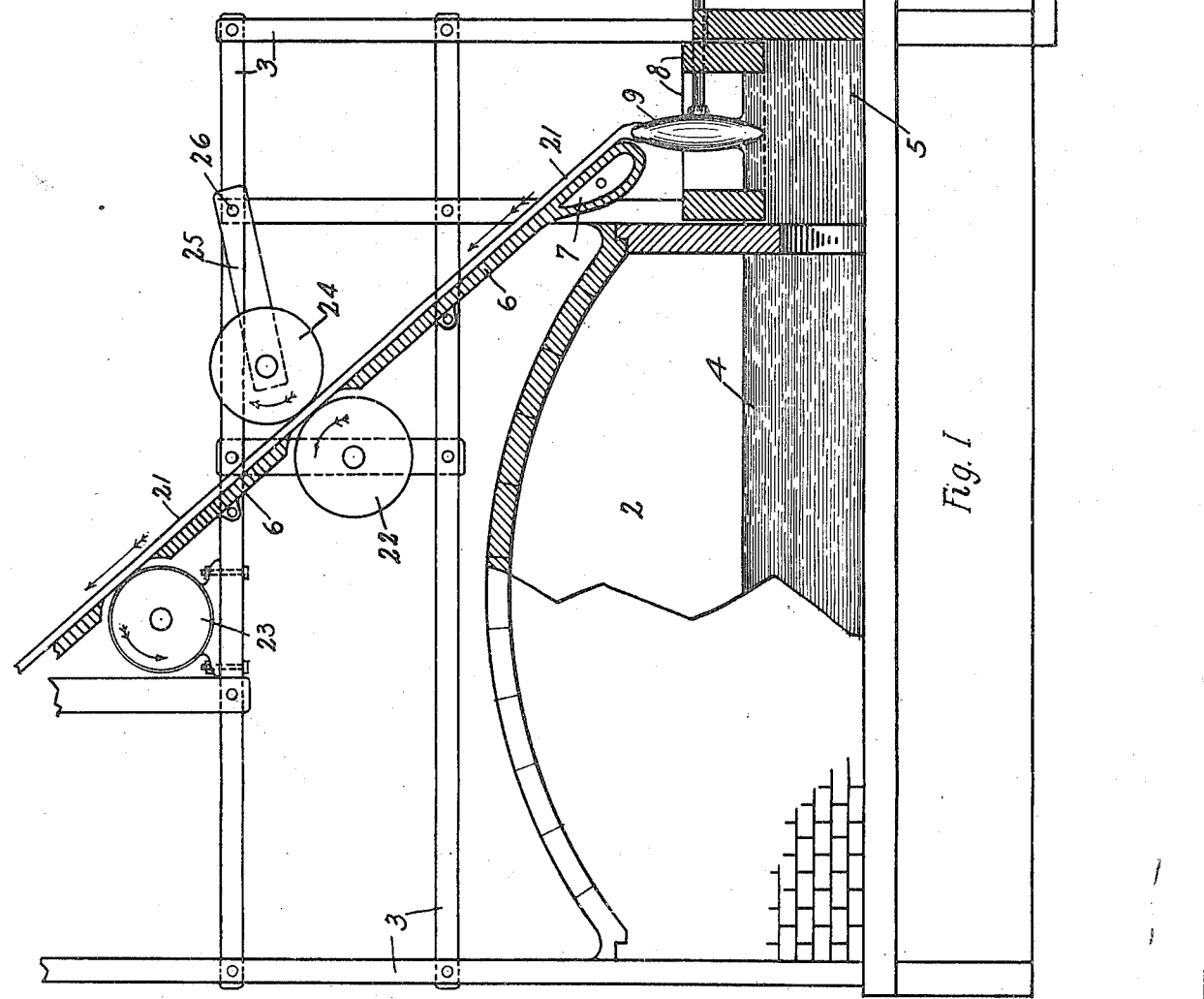
Witnesses
Ed. Davis
Louis A. Carr
Inventor
Lewis. D. Merrill.
By G. H. Duthie
Attorney.

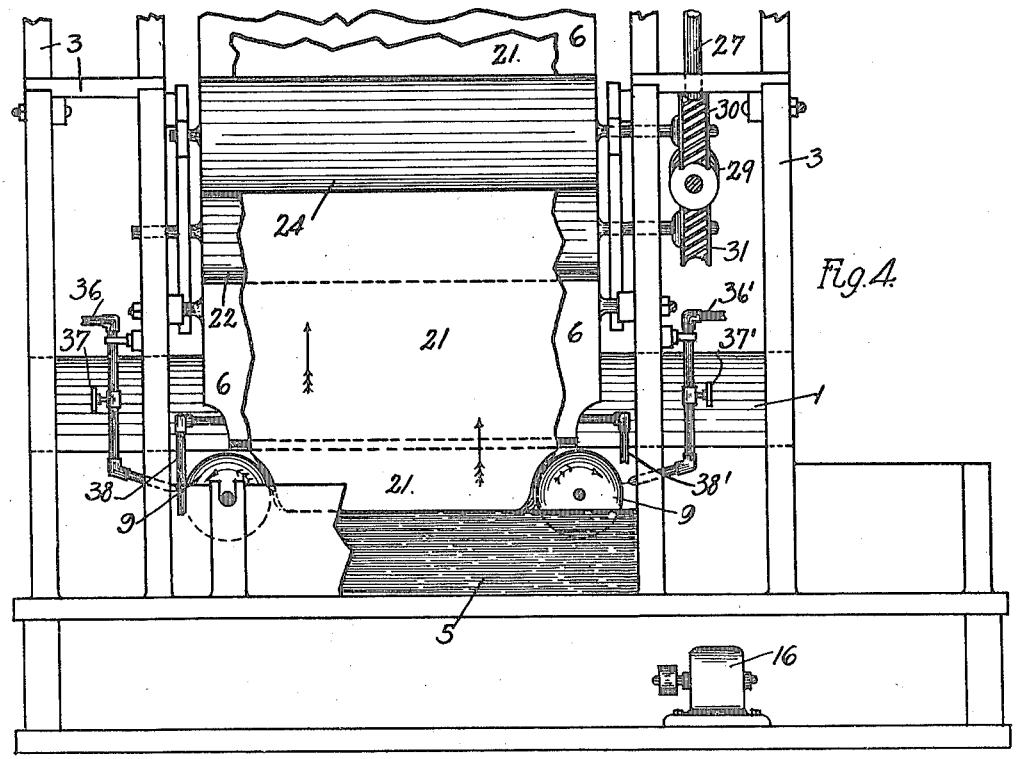
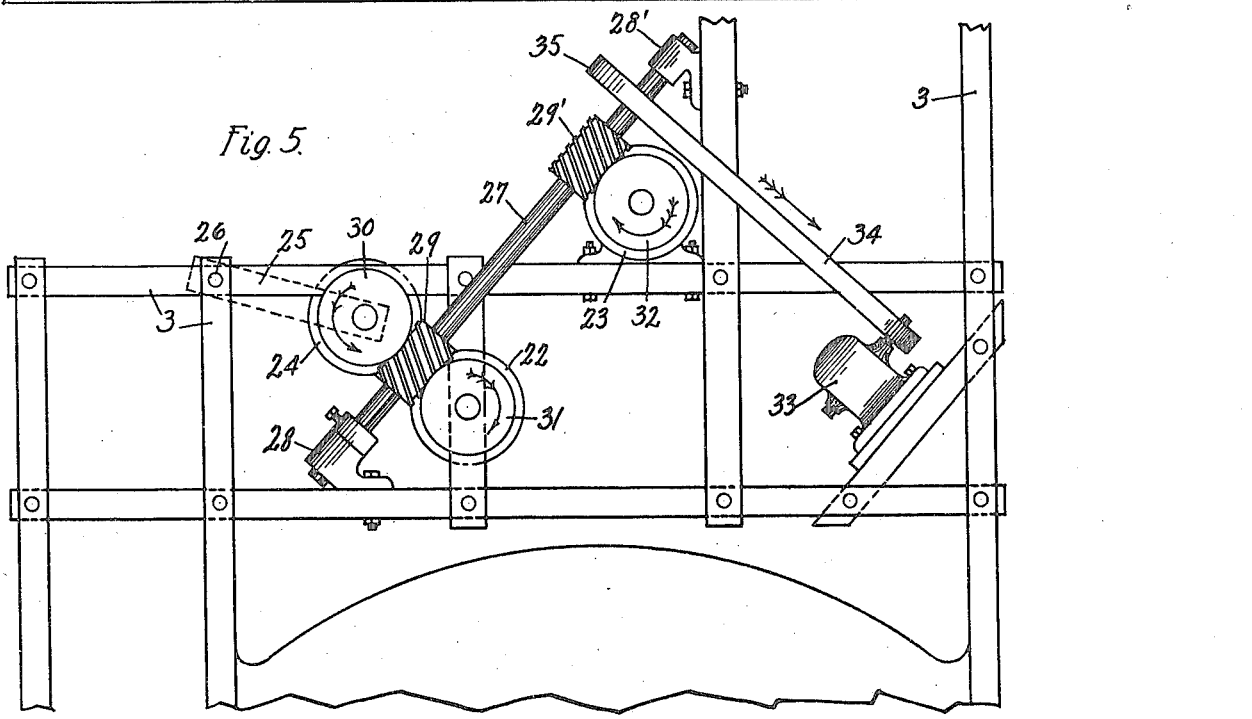

UNITED STATES PATENT OFFICE.

LEWIS D. MERRILL, OF CLARKSBURG, WEST VIRGINIA.

GLASS DRAWING AND FLATTENING DEVICE.

1,198,044.     Specification of Letters Patent.     Patented Sept. 12, 1916.

Application filed March 29, 1916. Serial No. 87,588.

*To all whom it may concern:*

Be it known that I, LEWIS D. MERRILL, a citizen of the United States, residing at Clarksburg, in the county of Harrison and State of West Virginia, have invented certain new and useful Improvements in Glass Drawing and Flattening Devices, of which the following is a full specification.

This invention comprehends new, novel, and useful improvements in the means and methods employed for gathering molten glass in a tank or furnace and drawing the same into a smooth flat sheet of glass. All of the parts of the devices may be operated with and connected to the glass furnace tank, and the frame work as now employed for producing sheet glass.

The present invention relates more especially to the means of gathering and raising molten glass from a tank in a thin sheet form, and drawing the same in a continuous flat straight sheet of uniform thickness and from which glass plates of different sizes may be produced.

The main object of this invention is the production of a simple practical method of producing sheet glass that will be flat, free from wrinkles and of uniform thickness, and which may when so desired be produced in sheets of different thicknesses. With this and other objects in view, as will hereinafter be fully described and claimed, it will be observed that my invention and improvements may be constructed of metal, fire clay, fiber, asbestos, or other combination of materials, and it is further understood that several changes may be made in the construction of my glass drawing devices without departing from the spirit and intent thereof; reference being had to the accompanying drawings in which:—

Figure 1 represents a side elevation of a glass furnace a portion of said furnace being broken to show the interior, and a vertical cross section of my invention as applied and operated for the continuous drawing of sheet glass. Fig. 2, is a plan view of the float and gathering device as it appears when removed from the molten glass tank. Fig. 3, designates an elevation of one of the glass gathering disks. Fig. 4, represents a front elevation of a glass tank a portion being broken to show a part of the interior of the tank and the detail application of my device for raising and drawing molten glass into a continuous flat sheet. Fig. 5, designates the opposite side elevation of the upper portion of the glass tank and frame showing the application and means employed for operating the upper portion of my sheet glass drawing device.

Referring to the drawings, similar numerals refer to similar parts throughout the several views.

In the drawings numeral 1 designates the molten glass tank constructed of fire brick or similar material having a gathering tank in the front portion thereof all of which is constructed upon a substantial foundation. 2, designates the interior portion of said tank.

3, designates the frame work which binds the tank securely together and forms the superstructure for supporting and carrying my sheet glass drawing device.

4, designates the molten glass within the main tank.

5, designates the molten glass within the gathering portion of the tank.

6, designates the straightening and cooling plate over and upon which the sheet glass is drawn and straightened.

7, designates the cooling chamber in the lower end of said plate through which cold water circulates and by means of which the lower portion of the straightening plate is preserved from damage resulting from being exposed to the heat of the molten glass and for the further purpose of reducing the temperature of the molten glass while being drawn into the sheet form.

8, designates a floating gathering frame constructed of metal, asbestos or other material, and which loosely fits within the gathering tank, and within which the molten glass is gathered.

9, designates gathering disks constructed of metal, asbestos or another suitable material.

The disks are located one at each end of the floating frame 8, and revolve upward in opposite directions to each other.

10, are the shafts upon which disks 9 are mounted.

11, designates adjustable journals in which shafts 10 revolve.

12, are combination journal brackets, which carry shafts 10 and 15.

13, are worm gear wheels mounted upon the outer ends of shafts 10.

14, designates the worm wheels mounted upon the upper end of shafts 15 and adapted to fit and engage the worm gear wheel teeth 13.

16, designates an electric motor.

17, is the belt which transmits the power from the motor to belt pulley 18 which is mounted on shaft 18'.

19 and 20 designate bevel gear wheels which transmit the power from shaft 18' to shafts 15, and by means of which combination power is transmitted to shafts 10, thereby causing the disks 9 to revolve in opposite directions.

Numeral 21 designates sheet glass being drawn upon the straightening plate 6.

22, 23, and 24, designate drawing rollers by means of which the molten glass is drawn from the gathering disks 9 and carried in an upward inclined direction upon the straightening plate 6.

25, designates swinging arm brackets pivoted upon the frame by means of pivot bolt 26, the lower ends of said arms forming journal bearings for roller 24.

27, designates a shaft connected to the furnace frame by means of journals 28 and 28', see Fig. 5.

29 and 29', designate worm wheels mounted on shaft 27.

30, 31, and 32, designate worm gear wheels mounted upon the outer ends of the same shafts which carry the drawing rollers 22, 23, and 24 respectively, the said worm wheels being adapted to engage the teeth of worm gear wheels 30, 31, and 32 and by means of which power is transmitted for revolving the drawing rollers as shown in Figs. 4 and 5.

Numeral 33 designates an electric motor.

34, is a motor belt by means of which power is transmitted from said motor to belt pulley 35 which is mounted upon and securely attached to shaft 27.

Characters 36 and 36' designate gas pipes through which gas flows for heating the gathering disks 9 to the proper temperature, the flow of gas being regulated by means of valves 37 and 37'.

Numerals 38 and 38' designate water pipes which are connected to the cooling chamber of the straightening plate 6 through which pipes cold water is admitted and discharged for cooling to the proper temperature the lower end of straightening plate 6.

It will be understood that different means of applying power for the operating of my glass drawing device may be employed preferably, electric motors the desired variations in speed being obtained and regulated by means of electric controllers. It will also be understood that the outer surface of the glass drawing rollers 22, 23, and 24 will be covered with vulcanized rubber or other suitable fiber adapted for clinging to and drawing sheet glass as herein described.

In the operation of my sheet glass drawing devices it will be observed that the floating frame 8 and disks 9 rest upon the surface of the molten glass within the gathering tank and penetrate down into said molten glass a limited distance, and by means of revolving disks 9 in opposite upward direction to each other, and under proper temperature the molten glass will be gathered and clings to a certain degree to the said disks and is thereby drawn in an upward sheet from, and for starting the sheet glass by use of tongs or other means the said sheet glass is raised and drawn from the said disks upon and over the inclining plate 6 until the said sheet glass enters between the drawing rollers 22 and 24 the said rollers revolving in the direction as indicated by the arrows, the rollers continuing to draw said glass from the aforesaid disks, and the sheet glass being carried upward as indicated by the arrows passes over carrying rollers 23, and above which the said sheet glass is cut into sheets of the desired sizes. It will be observed further that the consistency of the molten glass and the variation in the speed of the revolving of disks 9, and the drawing rollers 22 and 24 will regulate and produce sheet glass of the thickness desired. It will also be observed that drawing rollers 22 and 23 are held in a straight line and level position with the upper surface of straightening plate 6. While it will be observed further that drawing roller 24, is carried by and journaled in swinging bracket arms 25, and that said roller rests upon the sheet glass immediately over roller 22 with sufficient pressure friction to produce the desired drawing results.

Having fully described my invention what I claim as new and desire to secure by Letters Patent is:—

1. In a sheet glass drawing device of the character described, the combination with a tank for containing molten glass, a pair of revolving glass gathering disks spaced apart within said tank, a straightening plate extending upward in a slanting position immediately above said tank and disks, having a water cooling chamber at the lower end of said straightening plate and means for drawing straight sheet glass upon the upper surface of said plate as described and set forth.

2. In a sheet glass drawing device of the character described, the combination with a tank for containing molten glass, a pair of revolving glass gathering disks spaced apart within said tank, a straightening plate extending upward in a slanting position immediately above said tank and disks, glass drawing friction rollers extending crosswise of said straightening plate, the surface of the lower rollers extending through openings in said plate and in line with the upper surface thereof, the upper friction roller adapted to engage and rest upon the drawing sheet glass, and means for revolving said rollers for continuous sheet glass drawing, substantially as set forth and described.

In testimony whereof, I hereunto affix my signature.

LEWIS D. MERRILL.

Witnesses:
 E. L. DAVIS,
 LOUIS A. CARR.